UNITED STATES PATENT OFFICE.

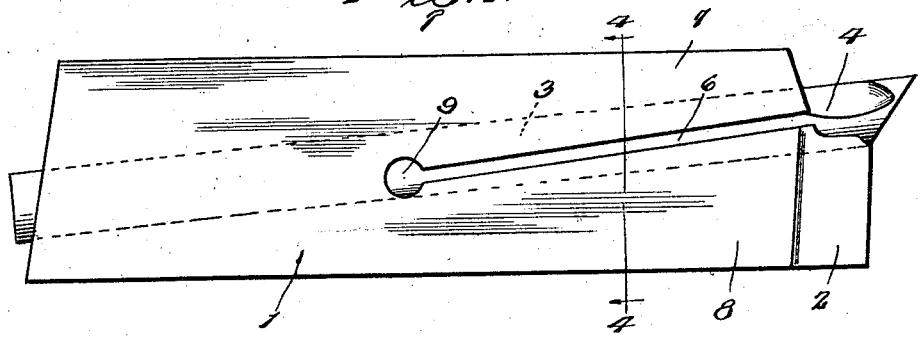
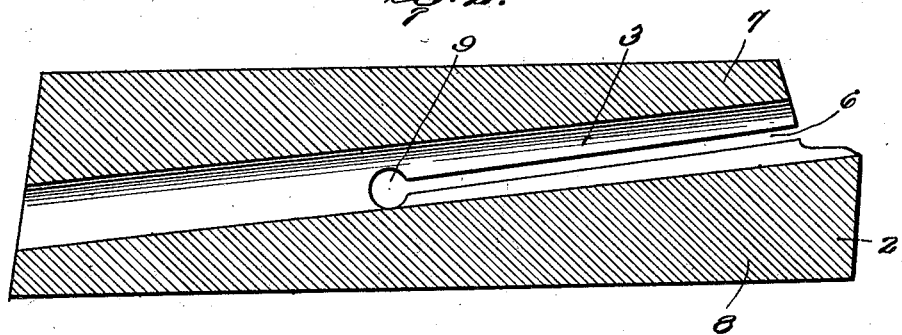
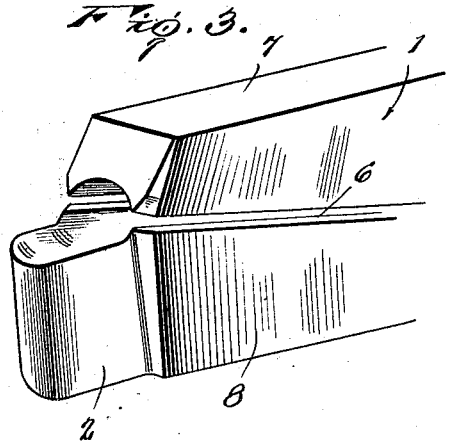
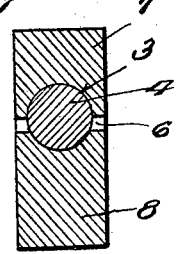
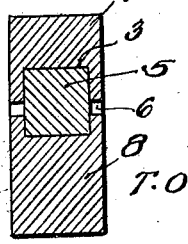

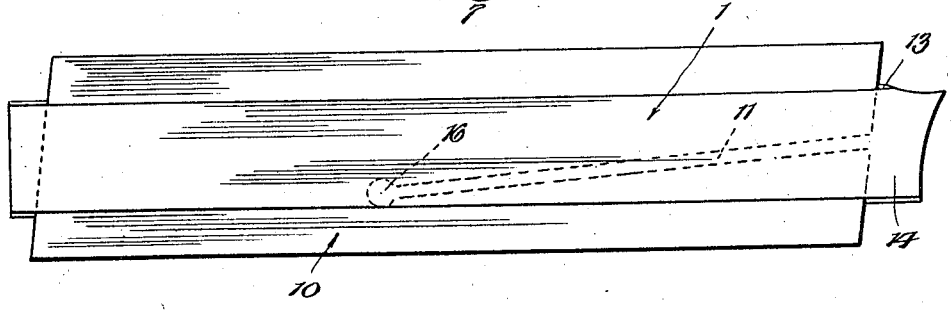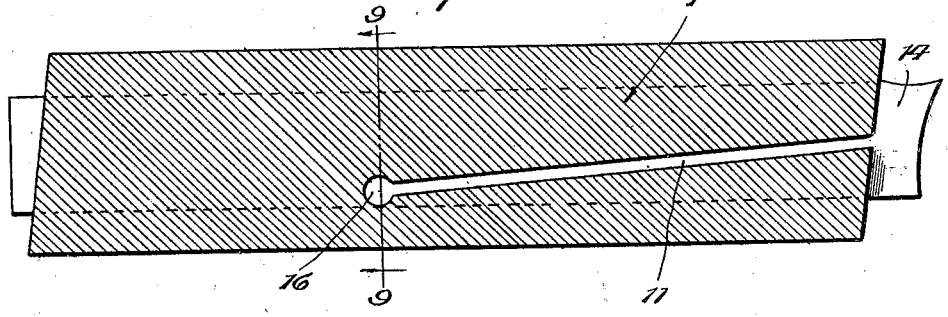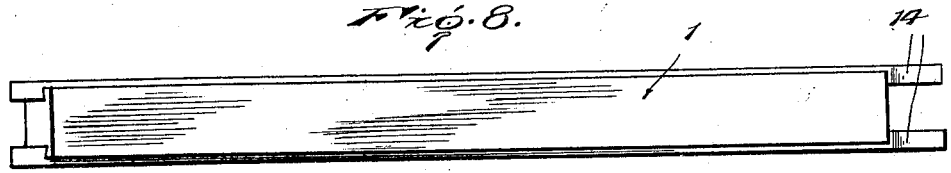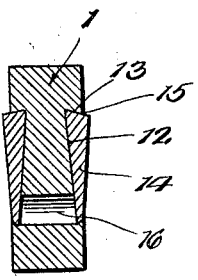

TREVILLIE O. MARTIN, OF JACKSON, TENNESSEE.

TOOL HOLDER.

1,427,403. Specification of Letters Patent. Patented Aug. 29, 1922.

Application filed November 30, 1920, Serial No. 427,381. Renewed May 12, 1922. Serial No. 560,447.

*To all whom it may concern:*

Be it known that I, TREVILLIE O. MARTIN, a citizen of the United States, residing at Jackson, in the county of Madison and State of Tennessee, have invented certain new and useful Improvements in Tool Holders, of which the following is a specification.

This invention relates to machine tool holders and has as one of its objects to provide a tool holder adapted to receive and firmly support a tool or tool bit of any ordinary length and which may be of dimensions and cross sectional shape to fit within the holder, so that worn or broken drill bits may be employed in the stead of the more expensive tool bits and thus be made to serve a useful purpose after they have become unfit for use for their original purpose.

Another object of the invention is to so construct the holder that the tool or tool bit supported thereby, even if relatively short in length may be securely clamped and prevented from chattering during the cutting operation.

A further object of the invention is to so construct the tool holder that the jaw members thereof will be given a desired degree of resiliency and whereby one of the jaw members in particular will be so joined with the shank of the holder as to increase the resiliency of the connection and adapt the said jaw member to be more readily and effectually clamped against the tool and without likelihood of breakage of the connection.

In the accompanying drawings:

Figure 1 is a side elevation of one form of tool holder embodying the invention;

Figure 2 is a vertical longitudinal sectional view therethrough;

Figure 3 is a perspective view of the forward end or nose of the holder;

Figure 4 is a vertical transverse sectional view on the line 4—4 of Figure 1;

Figure 5 is a similar view illustrating a slight modification of the invention;

Figure 6 is a side elevation of a modified form of holder;

Figure 7 is a vertical longitudinal sectional view through the holder shown in Figure 6;

Figure 8 is a top plan view of the holder shown in Figures 6 and 7;

Figure 9 is a vertical transverse sectional view on the line 9—9 of Figure 7.

In that form of the invention shown in Figures 1 to 5 inclusive, the tool holder is designed to support and clamp a bit which is of round or polygonal contour in cross section, whereas the holder illustrated in Figures 6 to 9 inclusive is designed to support and clamp a pair of tools and is to be employed more especially in cutting off packing rings and in performing similar operations.

In the form of the invention illustrated in Figures 1 to 5 inclusive, the shank of the holder is indicated in general by the numeral 1 and this shank is provided at its outer end with a nose 2 which will presently be more specifically referred to. The shank is formed with a tool-receiving socket indicated by the numeral 3 and in the nature of a bore extending longitudinally from end to end of the shank. This bore does not extend parallel to the axis of the shank however but at its forward end is inclined downwardly obliquely to the axis of the shank to the rear or opposite end thereof. This socket or bore is of a contour to receive the specific form of tool or bit to be held and in the first four figures of the drawings is cylindrical and in Figure 5 is rectangular, the tool or bit 4, in the former instance being circular in cross section and the tool or bit 5 in the latter instance being rectangular in cross section. Inasmuch as the socket or bore opens through the opposite ends of the shank, it will be evident that a tool or tool bit shorter or longer than the shank as a whole may be gripped and held with equal facility. The shank at its forward or outer portion is divided by slots 6 formed in the opposite side walls of the bore or socket 3, so as to provide upper and lower jaw members 7 and 8 respectively. The slots 6 do not extend parallel to the axis of the socket or bore 3, but obliquely to the said axis, the forward ends of the slots being located substantially at opposite sides of the axis of the bore, but the slots rearwardly of their said ends being inclined downwardly with relation to the axis and terminating at their rear or inner ends in substantially cylindrical enlarged portions 9, the lower sides of the walls of which are substantially flush with the bottom of the socket or bore 3, as best shown in Figure 2 of the drawings. Thus the tool shank is of substantially uniform thickness in a vertical direction at the line of juncture of the lower jaw 8 with the rear portion of the shank, and by inclining the slots 6, in the manner stated, with relation to the axis of the bore or socket 3, the lower side of the enlarged portions 9 of the slots are located relatively close to the under side of the shank. Thus the jaw 8 is given increased resiliency at its point of juncture with the shank of the holder and may be urged in the direction of the jaw 7, to clamp the tool to be held, without likelihood of the jaw 8 being broken off and also without likelihood of the shank, rearwardly of the inner ends of the slots 6, being split. The manner in which this increased resiliency is obtained will be evident when it is considered that the holder at the point of juncture of the upper jaw 7 with the rear portion of the shank is not of uniform thickness in a vertical direction because the upper sides of the enlarged portions 9 of the slots 6 are located considerably below the upper side of the socket or bore 3. Therefore when the holder is disposed within the usual tool post and is clamped by pressure exerted against the edges of its upper and lower jaw members, the lower jaw member 8 will be sprung in the direction of the upper jaw member but as this connection with the rear portion of the shank is resilient to a relatively high degree, there will be no likelihood of the connection being fractured, and also it may be caused to more firmly and securely grip the tool or tool bit disposed within the bore or socket 3. As stated the forward or outer end of the bore or socket 3 opens at the upper side of the nose 2 so that the upper side of the said nose constitutes a continuation of the lower portion of the wall of the said bore or socket and thus the working end of a tool or tool bit disposed within the bore or socket will be given firm support upon the nose.

In that form of the invention shown in Figures 6 to 9 inclusive, the shank of the holder is indicated by the numeral 10 and is formed with a transverse slot 11 extending longitudinally but non-parallel to its axis and in fact inclined in the same manner as the slot 6 in the first described form of the invention. In this latter form of the invention the opposite side faces of the shank or body of the holder are formed with recesses 12 having beveled upper and lower walls 13 and adapted to receive a pair of tools or tool bits 14 which are of blade-like form and have beveled upper and lower edges 15 for engagement by the beveled walls 13 of the recesses. It will also be observed by reference to Figures 6 to 9 that the slot 11 is provided at its inner end with a cylindrical enlarged portion 16 the lower side of the wall of which is located immediately opposite and substantially in a plane with the bottom walls of the recesses 12 so that in this latter form of the invention as in the first-described form, the holder at the point of juncture of the lower jaw with the rear portion of the shank is of uniform thickness in a vertical direction.

Having thus described the invention, what is claimed as new is:

1. A tool holder comprising a shank provided with a tool-receiving socket extending from end to end thereof with its axis inclined with relation to the planes of the upper and under faces of the shank, the said shank being formed with a transverse longitudinally extending slot opening through the opposite walls of the socket, the said slot extending non-parallel to the axis of the socket with its inner end located substantially in the plane of the bottom wall of the socket.

2. In a tool holder of the class described, a shank comprising a solid body provided with a tool-receiving socket extending from end to end thereof, the said shank being formed with a slot in the wall of its socket extending longitudinally thereof for the major portion of the length of the shank whereby to provide upper and lower tool gripping jaw portions, the said slot at its outer end terminating substantially in the plane of the median line of the socket and therefore substantially medially dividing the socket to adapt the jaws at their outer ends to bear against substantially equal areas of the tool to be held, the slot being inclined from its said outer end obliquely with relation to the median line of the socket and at its inner end being formed with an enlargement the lower side of which is located substantially in the plane of the lower side of the socket whereby the body at the juncture of the lower jaw therewith is of uniform thickness throughout its width and rendered resiliently yieldable to readily adapt the lower jaw to be sprung in the direction of the upper jaw and into clamping engagement with the tool to be held when the holder is clamped in a tool post.

In testimony whereof I affix my signature.

TREVILLIE O. MARTIN. [L. S.]